April 18, 1939. A. T. MATTHEWS Re. 21,053

AWNING

Original Filed Dec. 7, 1932 3 Sheets-Sheet 1

INVENTOR
ALBERT T. MATTHEWS

BY Ely & Barrow

ATTORNEYS

April 18, 1939. A. T. MATTHEWS Re. 21,053

AWNING

Original Filed Dec. 7, 1932 3 Sheets-Sheet 2

INVENTOR
ALBERT T. MATTHEWS.

BY Ely & Barrow

ATTORNEYS

April 18, 1939. A. T. MATTHEWS Re. 21,053
AWNING
Original Filed Dec. 7, 1932 3 Sheets-Sheet 3
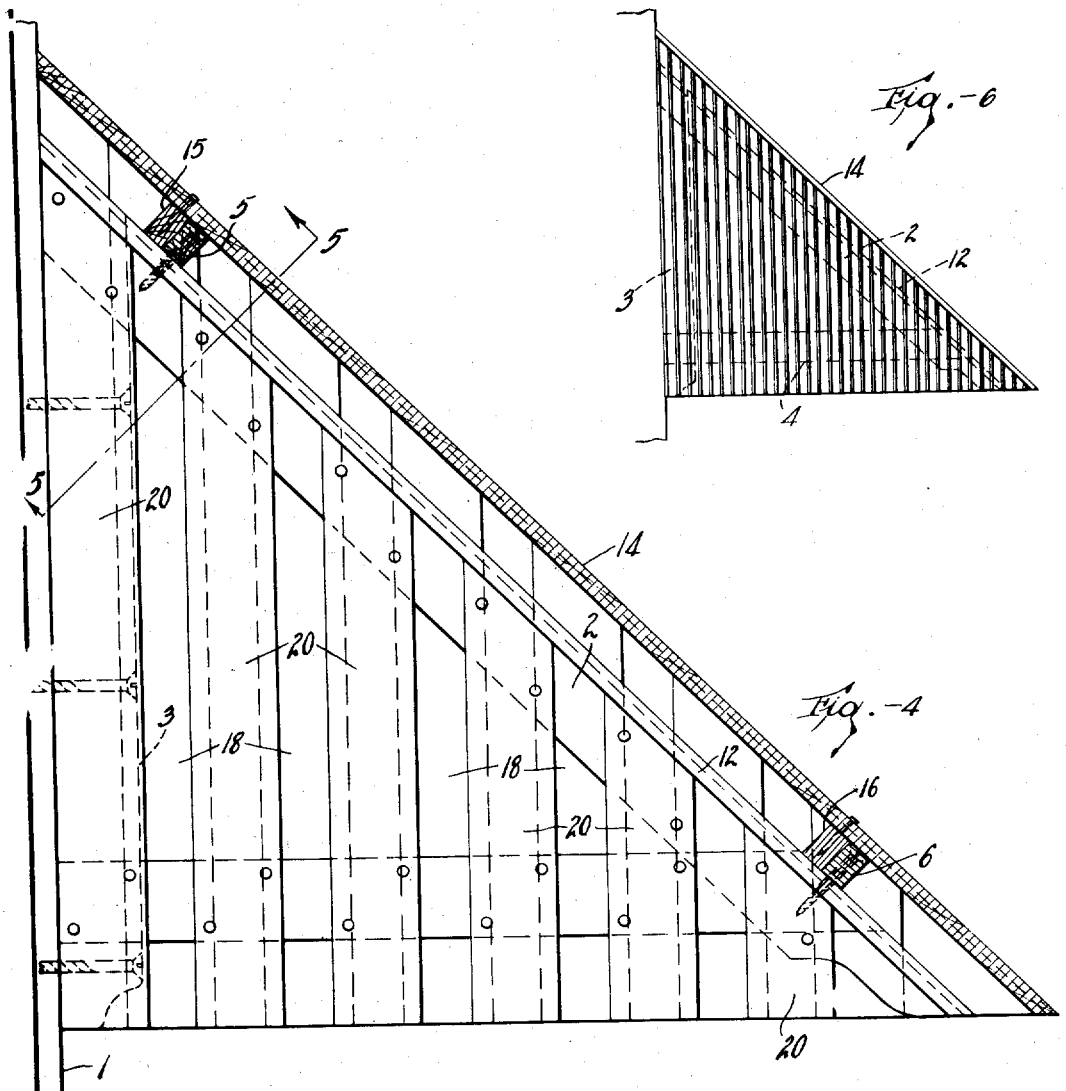
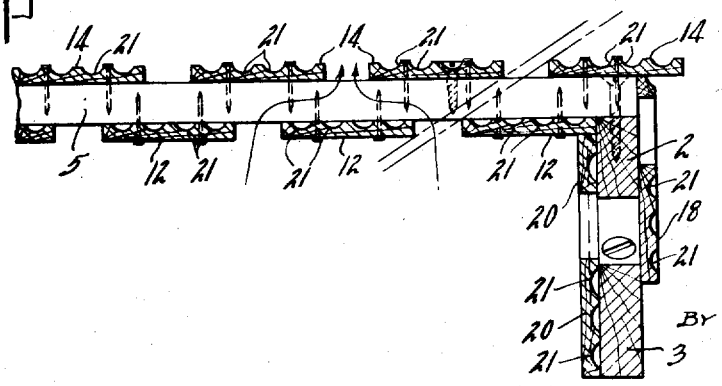
Fig.-4
Fig.-5
INVENTOR
ALBERT T. MATTHEWS
By Ely & Barrow
ATTORNEYS Reissued Apr. 18, 1939

Re. 21,053

UNITED STATES PATENT OFFICE 21,053

AWNING

Albert T. Matthews, Silvertown, Ga., assignor of one-half to Thornton G. Graham, Akron, Ohio Original No. 2,069,893, dated February 9, 1937, Serial No. 646,095, December 7, 1932. Application for reissue February 7, 1939, Serial No. 255,097

10 Claims. (Cl. 156—15)

The present invention relates to a new and improved awning which shall possess certain advantages over known forms of awning structures. The usual and well known awning is objectionable, especially in warm countries, for the reason that the body of air entrapped beneath the awning will become heated by the sun's rays and this heat will be transmitted to the interior of the building. There is no provision for escape of the air from beneath the awning and, as a result, the purpose for which awnings are used is largely defeated.

It is the purpose of the present invention to devise a practical awning which shall be measurably cooler than awnings now in use for it provides means whereby the air underneath the awning will be permitted to escape freely throughout the whole of the area of the awning. This useful purpose is accomplished without impairing the utility of the awning as a sunshade and also as a protection against rain.

The new awning structure is also attractive and adds to the beauty of any house to which it is applied. It is a permanent structure and will last indefinitely. It may be painted or finished in any desired color or shade and may be made of wood, metal, or composition material, which may be formed with any desirable or decorative surface so as to harmonize with the exterior finish of the dwelling.

The invention is capable of extended use in the general field of awnings and it will be found that a house equipped with the improved awning will be much cooler than houses equipped with the regular or standard awning. In fact, on even the hottest days a room, the windows of which are shaded by the improved awning, will be cool and comfortable.

The preferred or best known form or embodiment of the invention has been shown and will be described in detail in order that the invention will be made clear to those skilled in the art, but this does not means that the invention is to be restricted to the exact details or design shown, modifications and improvements being permissible within the scope of the invention as defined in the claims herein.

In the drawings in which the practical form of the invention is illustrated:

Figure 4 is an enlarged section of the awning on the line 4—4 of Figure 1;

Figure 5 is a section across the awning on the line 5—5 of Figure 4; and

Figure 6 is a side view of a modification.

The improved awning is attached in any desired or preferred manner to the frame 1 of a window, and this attachment may be permanent if desired or the awning may be made removable so that it may be taken down at the close of a season. It is not thought necessary to illustrate this detail as any well known method of attachment may be employed.

Figure 1:
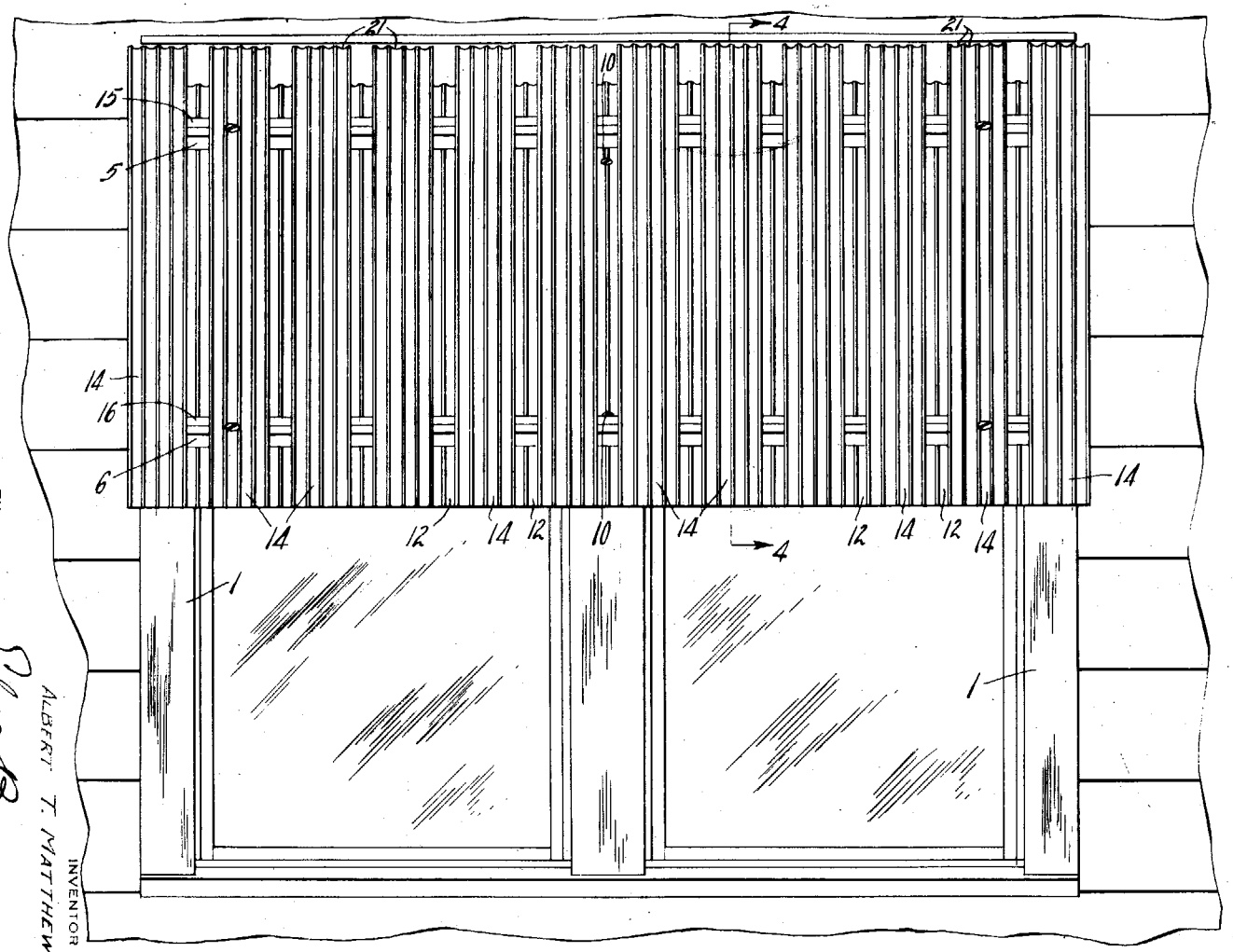
Figure 1 is a side elevation of a dwelling house, one of the windows of which is equipped with the improved awning.
Figure 2:
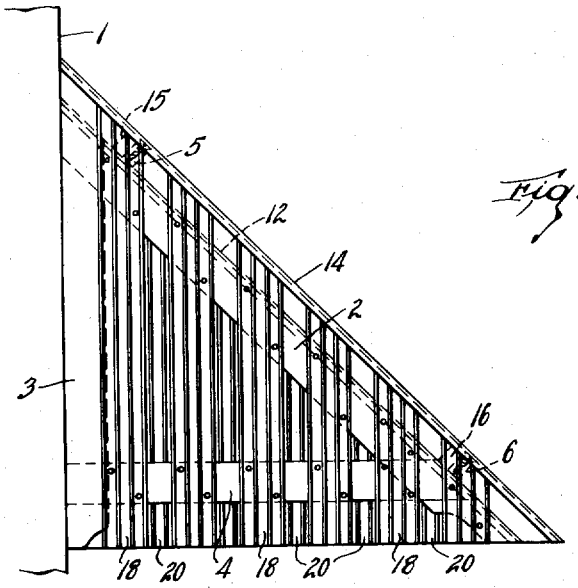
Figure 2 is a side view of the awning.
Figure 3:
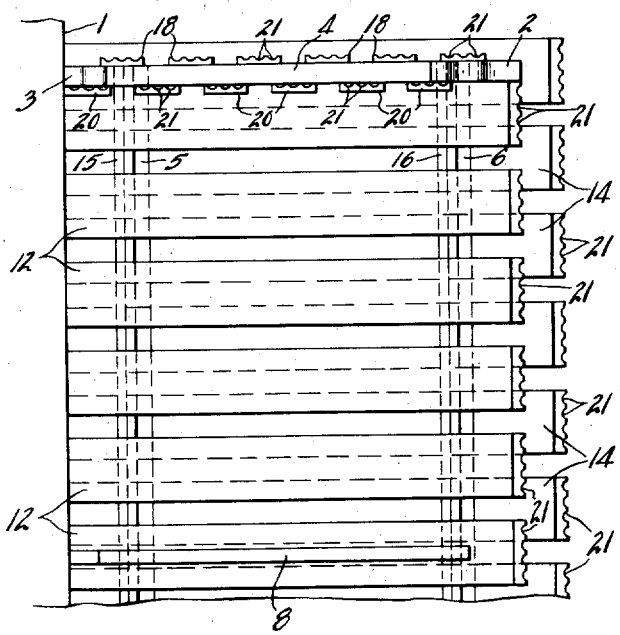
Figure 3 is a plan view of one end of an awning structure.

The structure disclosed is made of wood throughout, but it will be obvious that the principles of the invention may be extended to structures composed of other materials. As shown, the awning comprises two triangular end frames consisting of the inclined member 2, the vertical rear member 3 and the horizontal brace 4 which are permanently connected together to form the frame. The two frames are connected across the front at the required distance by the horizontal runners or battens 5 and 6 near the top and bottom of the frame. If the awning is to be of any considerable width it may be braced at midway points with intermediate frames similar to the end frames, but not necessarily of the same thickness. Such an intermediate frame is indicated in full lines at 8 in Figure 3, being secured to the structure by screws 10.

Across the upper surface of the awning is arranged the body or front section of the awning which is composed of not less than two layers or tiers of upwardly extending strips or slats. The lower set of strips is indicated at 12 and is attached directly to the battens 5 and 6. The upper set of strips, which is spaced from the lower set, is indicated at 14. These upper strips which are also spaced across the awning are attached to upper and lower battens 15 and 16 which rest above the battens 5 and 6 and may be attached thereto so as to prevent the upper set of strips from being blown away.

As is shown by the various figures of the drawings, the strips 12 and 14 are arranged in staggered relation so that each strip is located midway of the space between two adjacent strips of the other set and the spacing is such that light rays striking against the upper row or set of strips will be intercepted by the strips of the lower set. As shown in Figure 5, the direct rays of sunlight will be excluded except when projected at an extreme angle to the awning. If more nearly complete exclusion of direct rays of sunlight is desired, the spacing of the strips may be changed to accomplish this purpose. Rain entering the spaces between the upper set of strips will be intercepted by the lower set of strips. However, the heated air, which in ordinary awning constructions is trapped beneath the awning, is permitted to circulate through the circuitous passages provided by openings between the strips. This insures the escape of all the heated air and secures a free circulation throughout the awning.

The triangular end portions of the awning are composed of sets of outer strips 18 and inner strips 20 which are secured to the outer and inner sides of the members 2, 3 and 4. These strips are arranged in the same manner as the strips 12 and 14 and obstruct the sun and rain. They permit of free lateral circulation of the air through the awning, although it is not necessary that the end frames be so constructed, as they may be solid as shown in Figure 6.

The outer surfaces of all the strips are preferably grooved as shown at 21 so as to prevent buckling or warping to reduce the spattering of the rain and to conduct the rain down to the ends of the strips. This also adds to the attractiveness of the awning.

The entire awning may be constructed of wood, or it may be made of metal, enameled or glazed if desired, so as to be rustproof and to permit of the making of the awning in various colors. The upper set of strips may be made removable as a unit with the battens 15 and 16 for the purpose of painting. When an enameled metal construction is to be employed, this is not necessary and a single cross member may be substituted for each pair of longitudinal battens.

In both the top and end frames, the strips are arranged so that the space between each pair of strips is approximately one-third of the width of a strip and is located centrally of the strip opposed thereto. The end frames are also provided for the purpose of supporting the awning in its proper inclined position and such end frames may be of any desired construction, so long as they support the strips 12 and 14 which form the top of the awning.

It will be seen that an extremely attractive and ornamental awning has been devised which is cooler and more practical than the usual awning. The circulation of air through the awning makes the dwelling comfortable on the hottest days. The shape, size and particular design of the awning may be varied and modified within the scope of the invention.

What I claim and desire to secure by Letters Patent is:

1. An awning structure comprising end frames spaced apart in substantial parallelism and having inclined upper surfaces, battens extending in substantially parallel relation and having their opposite ends connected to said end frames adjacent the inclined upper surfaces, and strips spaced apart in substantially parallel relation with respect to said end frames and secured to the opposite sides of said battens, the strips on the opposite sides of said battens being staggered relatively and in substantially overlapping relation.

2. An awning structure comprising end frames spaced apart in substantial parallelism and having inclined upper surfaces, strips spaced apart in substantially parallel relation and disposed angularly with respect to the inclined upper surfaces, said strips being connected to the opposite sides of said end frames and the strips on the opposite sides of said end frames being staggered relatively and in substantially overlapping relation, battens extending in substantially parallel relation and having their opposite ends connected to said end frames adjacent the inclined upper surfaces, and strips spaced apart in substantially parallel relation with respect to said end frames and secured to the opposite sides of said battens, the strips on the opposite sides of said battens being staggered relatively and in substantially overlapping relation.

3. A slatted awning and drain comprising in combination with two spaced end rails, an upper series of parallel slats spaced apart and fastened in right angular relation with said rails, a lower series of parallel slats secured in staggered relation with the upper series and being fastened in right angular relation with said rails, said upper and lower slats being spaced horizontally and in overlapping relation and forming horizontal air passages and longitudinal drains, means for mounting said awning with the slats positioned lengthwise, said drains being designed to permit through passage of rain water away from the endwise face adjacent said wall and to discharge through the endwise face of the awning at the end spaced from the wall.

4. A slatted awning and drain comprising in combination with two spaced end rails, an upper series of parallel slats spaced apart and fastened in right angular relation with said rails, a lower series of parallel slats secured in staggered relation with the upper series and being fastened in right angular relation with said rails, said upper and lower slats being spaced horizontally and in overlapping relation and forming horizontal air passages and longitudinal drains, means for mounting said awning with the slats positioned lengthwise and inclined downwardly to permit drainage far removed from said wall, said drains being designed to permit through passage of rain water away from the endwise face adjacent said wall and to discharge at the endwise face of the awning at the end spaced from the wall.

5. A slatted awning and drain comprising in combination with two spaced end rails, an upper series of parallel slats spaced apart and fastened in right angular relation with said rails, a lower series of parallel trough-shaped slats secured in staggered relation with the upper series and being fastened in concave position and in right angular relation with said rails, said upper and lower slats being spaced horizontally and in overlapping relation and forming horizontal air passages and longitudinal drains, means for mounting said awning with the slats positioned lengthwise and inclined downwardly to permit drainage far removed from said wall, said drains being designed to permit through passage of rain water away from the endwise face adjacent said wall and to discharge through the endwise face of the awning at the end spaced from the wall.

6. An awning structure comprising, end supports spaced apart in substantial parallelism, battens having their opposite ends supported by the end supports and spaced from each other, and strips spaced apart in substantially parallel relation with respect to said end supports and secured to the opposite sides of said battens, the strips on the opposite sides of said battens being staggered relatively and in substantially overlapping relation.

7. An awning structure comprising, a pair of spaced battens disposed in parallel relation, strips spaced apart in substantially parallel relation and disposed at a right angle with respect to the battens, said strips being secured to opposite sides of the battens, the strips on the opposite sides of said battens being staggered relatively and in substantially overlapping relation, and end supports at the ends of the section formed by the battens and strips for supporting said section in an inclined position with respect to a vertical wall or support on which the awning may be mounted.

8. An awning structure comprising, a pair of spaced battens disposed in parallel relation, strips spaced apart in substantially parallel relation and disposed at a right angle with respect to the battens, said strips being secured to opposite sides of the battens, the strips on the opposite sides of said battens being staggered relatively and in substantially overlapping relation, the section formed by the strips and battens being adapted to have one longitudinal edge portion secured to a vertical wall, and end supports, each having one end secured to the section with its opposite end secured to said wall for supporting the section in an inclined position with relation to the wall.

9. An awning structure comprising, a pair of supporting battens extending in substantial parallel relation, a plurality of strips secured to the battens and spaced apart in parallel relation and extending at substantially a right angle to the battens, additional strips also secured to the battens and being spaced from and staggered relatively and in substantially overlapping relation with the first mentioned strips, means for securing one longitudinal edge portion of the staggered strip section to a support, whereby the section may incline downwardly and away from the support, and means secured to the support and to the transverse edges of the section for supporting the section in an inclined position.

10. An awning structure comprising, a front section including longitudinal supports, upper strips fastened to the supports and arranged in parallel spaced relation, lower strips also carried by the supports and spaced from the upper strips, said lower strips being spaced from each other and being arranged in staggered overlapping relation with respect to the upper strips whereby air may freely circulate between said upper and lower strips, means for securing the upper longitudinal edge portion of the front section to a support, and means secured to each transverse edge portion of the front section for supporting said front section in an inclined position with relation to said support.

ALBERT T. MATTHEWS.